(12) United States Patent
Yu et al.

(10) Patent No.: US 8,219,406 B2
(45) Date of Patent: Jul. 10, 2012

(54) SPEECH-CENTRIC MULTIMODAL USER INTERFACE DESIGN IN MOBILE TECHNOLOGY

(75) Inventors: Dong Yu, Kirkland, WA (US); Li Deng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1182 days.

(21) Appl. No.: 11/686,722

(22) Filed: Mar. 15, 2007

(65) Prior Publication Data

US 2008/0228496 A1 Sep. 18, 2008

(51) Int. Cl.
*G10L 21/00* (2006.01)

(52) U.S. Cl. ........................ 704/275; 704/270

(58) Field of Classification Search .................. 704/275, 704/270
See application file for complete search history.

(56) References Cited

U.S. PATENT DOCUMENTS

| | | | | |
|---|---|---|---|---|
| 5,600,765 | A * | 2/1997 | Ando et al. | 345/668 |
| 5,781,179 | A * | 7/1998 | Nakajima et al. | 345/157 |
| 6,438,523 | B1 | 8/2002 | Oberteuffer et al. | |
| 6,694,295 | B2 * | 2/2004 | Lindholm et al. | 704/252 |
| 6,779,060 | B1 * | 8/2004 | Azvine et al. | 710/65 |
| 7,092,928 | B1 | 8/2006 | Elad et al. | |
| 7,487,453 | B2 * | 2/2009 | Goebel et al. | 715/746 |
| 7,630,900 | B1 * | 12/2009 | Strom | 704/275 |
| 2002/0068605 | A1 | 6/2002 | Stanley | |
| 2002/0095295 | A1 * | 7/2002 | Cohen et al. | 704/275 |
| 2003/0176997 | A1 | 9/2003 | Wajda | |
| 2003/0218638 | A1 | 11/2003 | Goose et al. | |
| 2004/0056907 | A1 | 3/2004 | Sharma et al. | |
| 2004/0172258 | A1 | 9/2004 | Dominach et al. | |
| 2006/0052080 | A1 | 3/2006 | Vitikainen et al. | |
| 2006/0111906 | A1 | 5/2006 | Cross et al. | |
| 2006/0122840 | A1 | 6/2006 | Anderson et al. | |
| 2006/0136222 | A1 | 6/2006 | Cross et al. | |
| 2006/0218193 | A1 | 9/2006 | Gopalakrishnan | |
| 2006/0247925 | A1 | 11/2006 | Haenel et al. | |

FOREIGN PATENT DOCUMENTS

EP 1400953 3/2004

OTHER PUBLICATIONS

Sharma, R., et al., 'Speech-gesture driven multimodal interfaces for crisis management' In: Proceedings of the IEEE, Sep. 2003, vol. 91, No. 9, pp. 1327-1354, ISSN 0018-9219.

Ketterbekov, S., et al., 'Toward multimodal interpretation in a natural speech/gesture interface' In Proceedings 1999 International Conference on Information Intelligence and Systems, Oct. 31-Nov. 1999, pp. 328-335, ISBN 0-7695-0446-9.

International Search Report and Written Opinion dated Jul. 31, 2008 for PCT Application Serial No. PCT/US20081057175, 10 pages.

(Continued)

*Primary Examiner* — Talivaldis Ivars Smits
*Assistant Examiner* — Shaun Roberts

(57) ABSTRACT

A multi-modal human computer interface (HCI) receives a plurality of available information inputs concurrently, or serially, and employs a subset of the inputs to determine or infer user intent with respect to a communication or information goal. Received inputs are respectively parsed, and the parsed inputs are analyzed and optionally synthesized with respect to one or more of each other. In the event sufficient information is not available to determine user intent or goal, feedback can be provided to the user in order to facilitate clarifying, confirming, or augmenting the information inputs.

19 Claims, 12 Drawing Sheets

OTHER PUBLICATIONS

"Freedom of Speech: How Embedded Speech Recognition Benefits Mobile Device Users"; Digital Lifestyles 2006; Published by Voice Signal Technologies; Woburn, MA; Sep. 12, 2002; pp. 1-7.

"Project plan"; Vocals: Prosjektbeskrivelse; NTNU Institute for Teleteknikk; SINTEF; ,www.iet.ntnu.no/projects/vocals/projdes.php; downloaded Dec. 11, 2006; pp. 1-11.

Kvale, K. et al.; "Speech Centric Multimodal Interfaces for Mobile Communication Systems"; Telektronikk; Feb. 2003; pp. 104-117.

Oviatt, S. et al.; Designing the User Interface for Multimodal Speech and Pen-based Gesture Applications: State-of-the-Art Systems and Future Research Directions; Journal of Human Computer Interaction; vol. 15, Issue 4, Dec. 2000; pp. 263-322.

Yu, D. et al.; Speech-Centric Multimodal User Interface Design in Mobile Technology; IGI Global; Jan. 2008; pp. 461-477.

* cited by examiner

SPEECH-CENTRIC MULTIMODAL USER INTERFACE DESIGN IN MOBILE TECHNOLOGY

BACKGROUND OF THE INVENTION

Graphical user interfaces (GUI) have significantly improved computer human interface by employing intuitive real-world metaphors. However, GUIs are still far from achieving a goal of allowing users to interact with computers without significant training. In addition, GUIs often rely heavily on a graphical display, keyboard and pointing devices that are not always available. Mobile computers have constraints on physical size and battery power, or present limitations due to hands-busy eyes-busy scenarios which make employment of traditional GUIs a challenge. In addition, with more and more computers designed for mobile usages and hence subject to physical size and hands-busy or eyes-busy constraints, traditional GUI faces an even greater challenge with respect to interaction therewith.

Speech recognition technology enables a computer to automatically convert an acoustic signal uttered by users into textual words, freeing them from constraints of the standard desktop-style interface (such as for example mouse pointer, menu, icon, and window etc.). The technology has been playing a key role in enabling and enhancing human-machine communications. Speaking is the most natural form of human-to-human communication. One learns how to speak in childhood, and people exercise speaking communication skills on a daily basis. The possibility to translate this naturalness of communication into the capability of a computer is a logical expectation, since computers are equipped with substantial computing and storage capacities.

However, the expectation that computers should be good at speech has not yet become a reality. One important reason for this is that speech input is prone to error due to imperfection of speech recognition technology in dealing with variabilities from speaker(s), speaking style, and acoustic environment. While spoken language has the potential to provide a natural interaction model, the difficulty in resolving ambiguity of spoken language and the high computational requirements of speech technology have so far prevented it from becoming main stream in a computer's user interface. This imperfection, in addition to a number of social and other reasons, raises the issue that speech alone is not sufficient as a most desirable input to computers. Use of multimodal inputs in a human computer interface (HCI) system, which fuses two input modalities (e.g., speech and pen, or speech and mouse) to overcome imperfection of speech technology in its robustness as well as to complement speech input in other ways has been explored. However, conventional multi-modal input systems have considerable room for improvement toward providing an efficient HCI.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

A multi-modal human computer interface (HCI) in accordance with embodiments described herein provides for a user to employ a variety of available information input mechanisms to enhance conveying of his/her intent and increase probability of such intent being gleaned by a computing device. The multi-modal HCI provides for receiving a subset of a plurality of available inputs (e.g., speech, text, pen, patterns, key strokes, touch, drawing, mouse, gestures, gaze, lip movements, audio, images, hand writing, bounding, inflection, motion, temperature, time, altitude, location, orientation, facial recognition, context, entity state, expected future state, destination, audio, video, analog inputs, digital inputs . . . ) concurrently, or serially, and leveraging off of employment of more than one input to determine user intent with respect to an information input or goal. Received inputs are respectively parsed, and the parsed inputs are analyzed and optionally synthesized with respect to one or more of each other. Synthesizing respective inputs can often provide more information about user intent than from analysis of inputs in isolation. For example, an incomprehensible utterance can be synthesized with a handwritten note to infer or discern intent of the utterance. Extrinsic information (e.g., user state, context, environment, noise, user preferences, contactee, device capabilities, . . . ) can be employed to facilitate converging on user intent and enhancing an HCI session.

In the event sufficient information is not available to determine user intent, feedback can be provided to the user in order to facilitate determining, or clarifying intent. For example, if environmental conditions result in excessive noise making speech recognition difficult, feedback can prompt the user to employ another modality (e.g., text or pen) as a primary form of information input. Upon the noise being dissipated to a suitable level, the user can be prompted to re-engage with speech input as a primary modality if desired. Moreover, the feedback can be in the form of seeking conformation of inferred or determined user intent.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DESCRIPTION OF THE INVENTION

Figure 1:
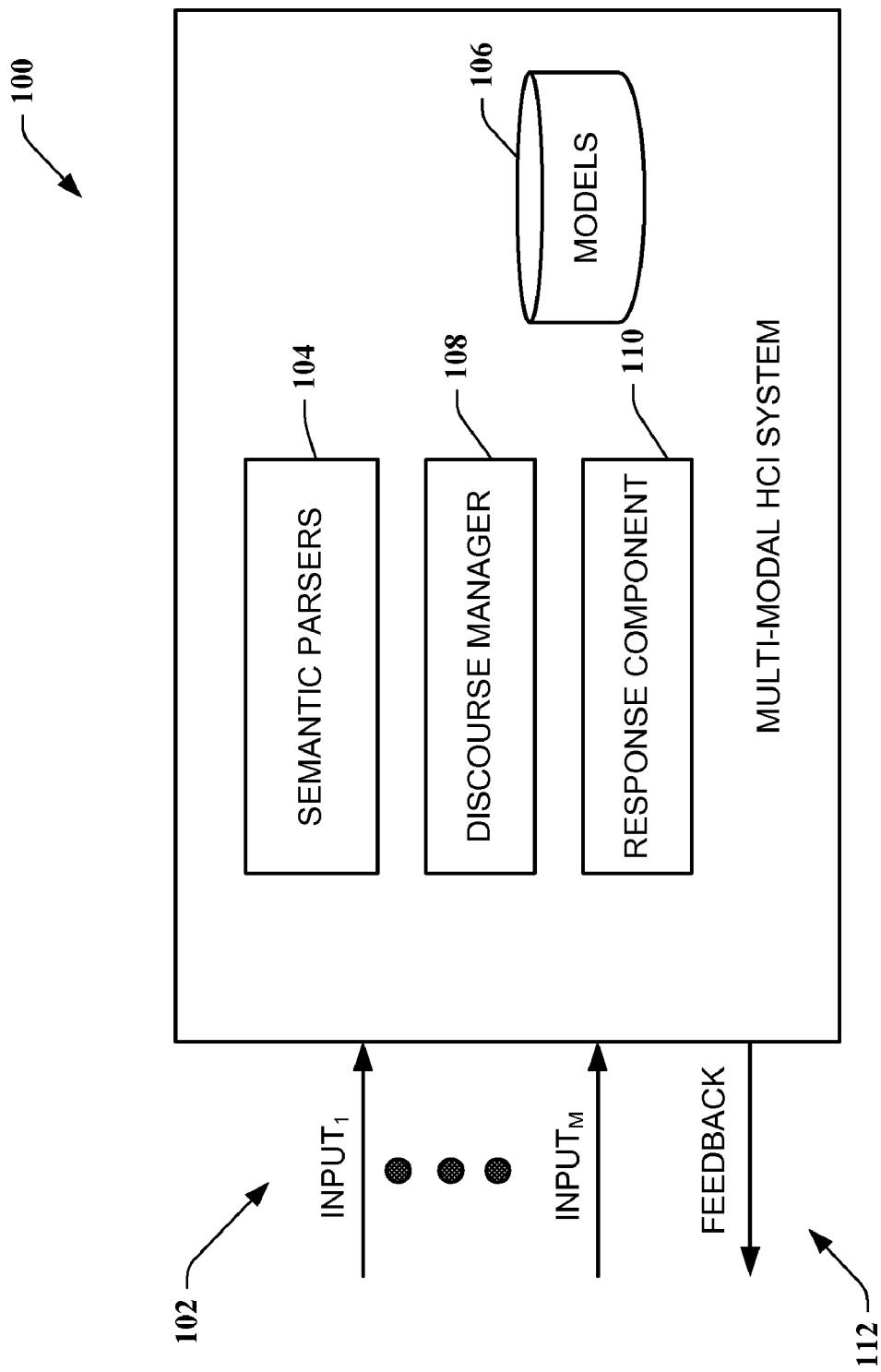
FIG. 1 is a block diagram that illustrates a computer-implemented multi-modal HCI system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", "schema", "algorithm" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A significant ultimate goal of a human computer user interface (HCI) is to fulfill needs and requirements of users. In accordance with principles emphasized by user-centered design (UCD), acceptability of an HCI can be judged using three main attributes, for example: effectiveness, efficiency, and learnability. Effectiveness assesses whether users can complete tasks and achieve goals with a predefined degree of perceived accuracy. It is usually measured on a targeted user population, over a specified range of tasks and environments. Efficiency judges how much effort (e.g., cognitive demand, fatigue, stress, frustration, discomfort, . . . ) and resources (e.g., time) are needed for users to perform specific tasks. It is usually measured with total time (including time for error corrections) taken to complete a task. Learnability measures whether users can easily discover a system's functionality and quickly learn to use the system. Various systems and methods described herein employ, or factor a subset of these attributes in connection with enhancing HCI functionality.

FIG. 1 depicts a multi-modal HCI system 100 in accordance with various embodiments and features described herein. The system 100 provides for receiving a set of M inputs 102 (M being an integer) from a variety of sources (e.g., speech, text, pen, patterns, key strokes, touch, drawing, mouse, gestures, gaze, lip movements, audio, images, hand writing, bounding, inflection, motion, temperature, time, altitude, location, orientation, facial recognition, context, entity state, expected future state, destination, audio, video, analog inputs, digital inputs . . . ). The set of inputs 102 are respectively parsed by a set of semantic parsers 104. The parsers 104 receive the raw input data, analyzes the data, and transforms, re-formulates, or extract therefrom a corresponding subset of meaningful, more formal and detailed language that facilitates gleaning intent of an entity—it is to be appreciated that an entity can be an individual, a set of individuals, a machine, set of machines, software, hardware, or a combination thereof. Any suitable type of semantic parsing techniques (e.g., semantic role labeling, mapping sentences to meaning representation language (MRL), semantically augmented parse trees, semantic parsing using support vector machines (SVMs), natural language parsing, statistical or probabilistic semantic parsing techniques, voice recognition, pattern recognition, hand-writing recognition, etc.) can be employed.

To facilitate recognizing, parsing, or translation of inputs, the parsers 104 can access a set of models 106. As discussed in greater detail infra, the models 106 can include for example language models, semantic models, context models, behavior models, etc. that facilitate determining or inferring goals of an entity. A discourse manager 108 analyzes raw and/or parsed information as well as optionally information from one or more of the models 106, and determines or infers communication goals of the entity. The system 100 leverages off of utilization of a plurality of inputs to facilitate determining communication or information goals. Conventional single input or dual input recognition systems are often deficient at determining communication goals. The subject system 100 identifies correlations among disparate inputs and can use one input to clarify or confirm another input or vice versa. Moreover, the inputs can be analyzed in parallel as well as serially so that a user can start a communication with speech, augment, interject, or complete the communication using another modality (e.g., text or handwriting). Thus, for example, a user could input a search query in the following manner using the system 100: (1) utter "locate a seafood restaurant here", and (2) zoom into a particular location within a map, and (3) circle a region on a map. The system 100 would parse the utterance to formulate a search query for a seafood restaurant, and bound that query to seafood restaurant located within a geographic region defined by the circled portion of the map. Accordingly, multiple inputs are employed by the system 100 to converge quickly and accurately on communication/information goals of an entity.

The combination of multiple input modalities provided for quickly converging on user intent (e.g., find a seafood restaurant located within a specific geographic region) as well as dynamically resolve potential ambiguity (e.g., further interpret "here" with the geographic region that was zoomed in upon and them bounded by a pen circling a specific area. Moreover, the use of multiple modalities streamlined the amount of time and level of input required by an entity as compared to conventional MUI systems. For example, a conventional MUI system might require the entity to provide zip code or street information in a single or set of utterances, while the subject system provided for the entity to further define one input (the utterance of "here") with another set of inputs (zooming and bounding with a pen stoke). It is to be appreciated that even more inputs could have been provided (e.g., an image of a particular logo associated with a particular restaurant chain could have been used to further bound the query). Moreover, inflection of the user's voice or level of stress could also be considered an input in connection with level of desired accuracy and time for processing required.

It is to be appreciated that uncertainty, or ambiguity can still occur even when employing multiple inputs as described above. A response component 110 can be employed to provide feedback 112 to the entity about determined or inferred goals of the entity based on the inputs analyzed thus far. The feedback can be for example in the form of seeking confirmation as to accuracy of a determined or inferred goal, asking for more information, requesting re-input of previous information (e.g., please repeat the command, please re-write the entry more legibly, etc.). The feedback can be in the form of audio, text, images, vibration, etc. Employment of feedback can facilitate training (e.g., implicitly or explicitly) the models 106 so as to improve analysis, decision-making, and inference in the future. Furthermore, the feedback can help train entities in connection with improving quality of inputs (e.g., more clear speech, greater legibility of hand writing, more concise entries, choice of words, etc.) so as to facilitate faster system response and improved accuracy.

The combination of multiple inputs and feedback provides for increased accuracy and speed over conventional recognition systems. It is to be appreciated that the certain inputs can be more heavily weighted than other inputs, e.g., as a function of confidence level. Furthermore, a utility-based analysis can be employed that factors the cost of making an incorrect decision versus the benefit associated with the decision being correct. Confidence levels can be dynamically generated as a function of historical data, entity state, context of the session, environment factors, and other extrinsic evidence. Moreover, confidence levels associated with one input modality can be employed to weight another input modality for an upcoming input. For example, if the user utters "save this license plate number", and then takes a picture of an automobile, the system 100 would recognize from the utterance that a number is desired to be stored, and then an analysis of the automobile image would apply greater processing resources to search for a string of letters and numbers in the image that would correspond to the desired license plate number. Once the license number was extracted from the image, the system 100 would generate an instruction to save the license number. It is to be appreciated that other components (e.g., pattern recognition component, processor(s), memory, etc.) could be employed in connection with the system to carry out the deciphered instruction.

The systems and methodologies described herein can be optionally employed in connection with a variety of devices (e.g., portable computing devices, laptops, personal data assistants (PDAs), gaming devices, cellular phones, voice over Internet protocol (VOIP) devices, cognitive phones, desktops, distributed computing systems, collaborative computing schemes (e.g., multiple users sharing resources), phone systems, home or work computing environments, automobiles, planes, boats, equipment, appliances, headsets, etc.). Accordingly, a variety of devices can employ the features described herein to facilitate an entity interacting therewith in order to streamline input effort required by the entity, and improve accuracy of analyzing such inputs, and taking action in connection with determined or inferred intent or goals of the entity.

Figure 2:
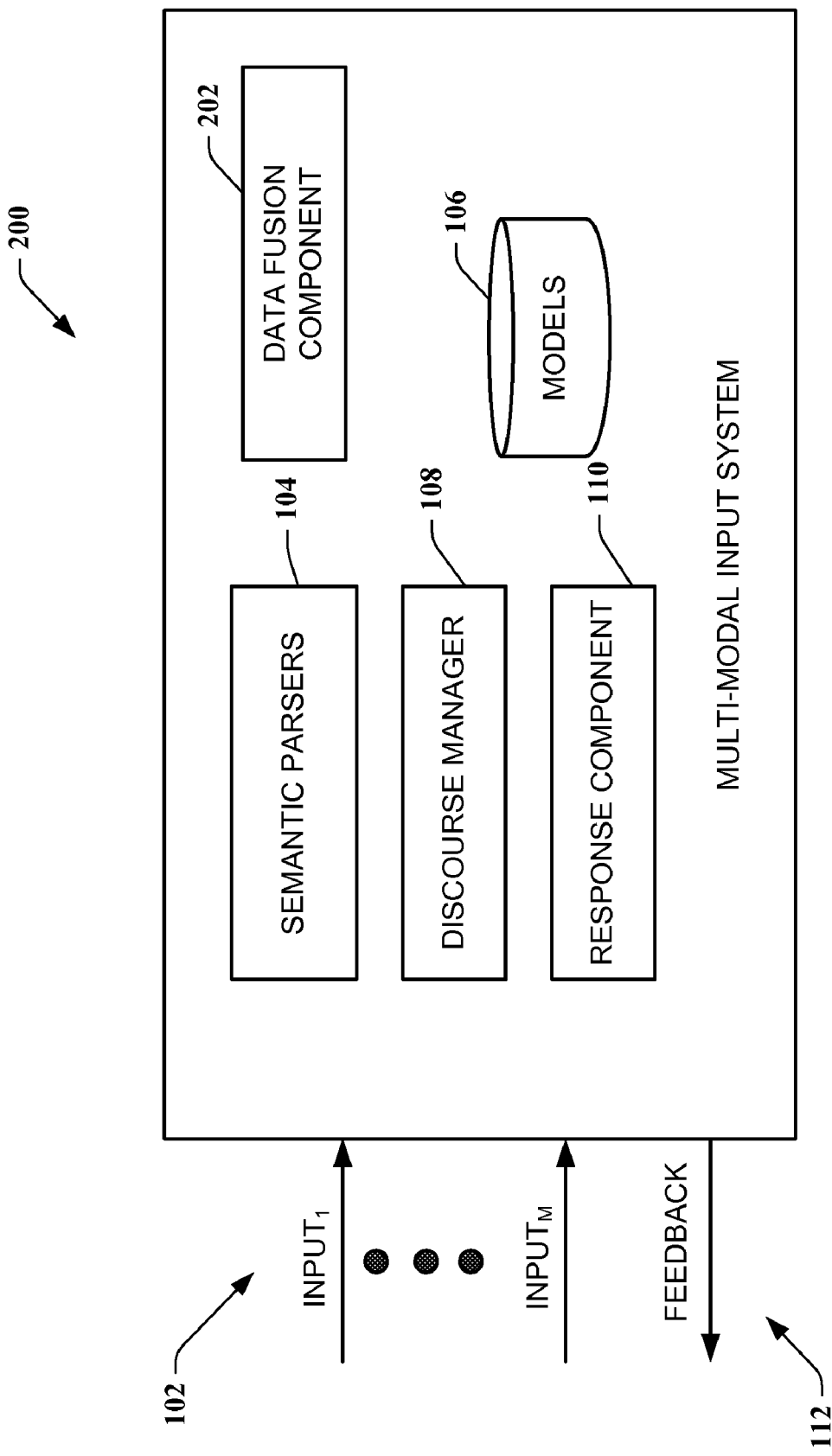
FIG. 2 is a block diagram that illustrates an embodiment of a multi-modal HCI system that employs a data fusion component.

FIG. 2 illustrates an embodiment of a system 200 that employs a data fusion component 202. For sake of brevity, components common to the embodiment of FIG. 1 will not be further discussed. Likewise, discussion regarding components repeated in connection with other embodiments may not be repeated for ease of readability.

It is to be understood that with various combinations of inputs there will be known correlations while there may also exist other correlations not readily apparent but yet still have an influence in connection with facilitating gleaning a communication or information goal. Accordingly, the data fusion component 202 can be employed to take advantage of information fission which may be inherent to a process (e.g., receiving and deciphering inputs) relating to analyzing inputs through several different sensing modalities. In particular, one or more available inputs may provide a unique window into a physical environment (e.g., an entity inputting instructions) through several different sensing or input modalities. Because complete details of the phenomenon to be observed or analyzed may not be contained within a single sensing/input window, there can be information fragmentation which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, or noise. In this context, data fusion techniques employed by the data fusion component 202 may include algorithmic processing of sensor/input data to compensate for inherent fragmentation of information because a particular phenomena may not be observed directly using a single sensing/input modality. Thus, data fusion provides a suitable framework to facilitate condensing, combining, evaluating, and interpreting available sensed or received information in the context of a particular application.

Thus, the data fusion component 202 can assist with further processing raw, or parsed inputs, and identify potential previously unknown correlations associated with sets, or subsets of inputs to facilitate determining, or inferring goals of an entity. Furthermore, the data fusion component 202 can facilitate further training of the models 106.

Figure 3:
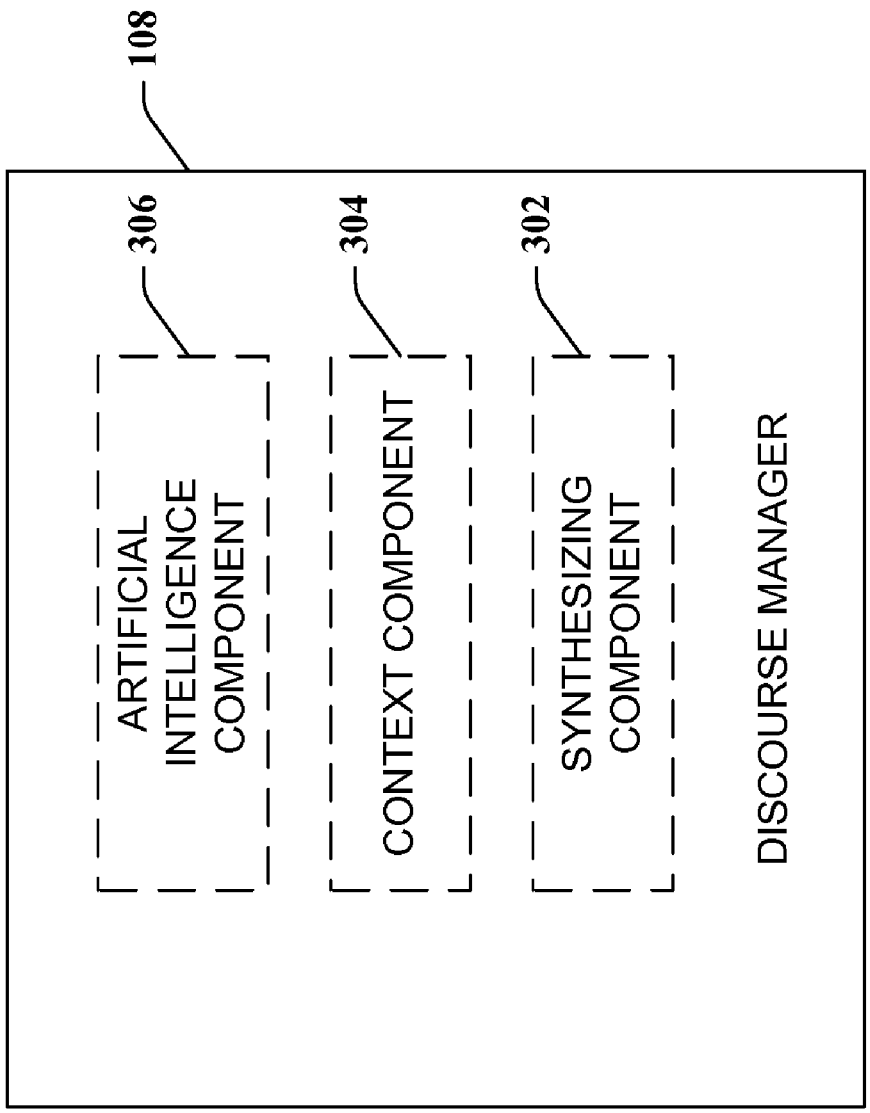
FIG. 3 is a block diagram that illustrates an embodiment of a discourse manager component.

FIG. 3 illustrates one particular embodiment of the discourse manager. The discourse manager 108 can employ a synthesizing component 302 to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g., processed) form. The synthesizing component 302 through combining and filtering can provide a set of information that can be more informative, or accurate (e.g., with respect to an entity's communicative or information goals) than information from just one or two modalities, for example. As discussed in connection with FIG. 2, the data fusion component 202 can be employed to learn correlations between different data types, and the synthesizing component 302 can employ such correlations in connection with combining, or filtering the input data.

A context component 304 can be employed to determine context 304 associated with a particular action or set of input data. As can be appreciated, entity context can play an important role with respect to understanding meaning associated with a particular set of inputs, or intent of an entity. For example, many words or sets of words can have double meaning (e.g., double entendre), and without proper context of use or intent of the words the corresponding meaning may be unclear thus leading to increased probability of error in connection with interpretation or translation thereof. The context component 304 can provide current or historical data in connection with inputs to increase proper interpretation of inputs. For example, time of day may be helpful to understanding an input—in the morning, the word "drink" would likely have a higher probability of being associated with coffee, or juice as compared to be associated with a soft drink or alcohol-based beverage during later hours. Context can also assist with interpreting uttered words that sound the same (e.g., steak, and stake). Knowledge that it is near dinner time of a user as compared to the user camping would greatly help with recognizing the following spoken words "I need a steak/(stake)". Thus, if the context component 304 had knowledge that the user was not camping, and that it was near dinner time, the utterance would be interpreted as "steak". On the other hand, if the context component 304 knew (e.g., via a GPS system input) that the user recently arrived at a camping ground within a national park, it might more heavily weight the utterance as "stake".

In view of the foregoing, it is readily apparent that utilization of the context component 304 to consider and analyze extrinsic information (e.g., entity state, application state, entity preferences, historical data, environmental data, urgency of an event, priority of information, etc.) can substantially facilitate determining meaning of a set of inputs.

An artificial intelligence (AI) component 306 can be employed to determine or infer intent or meaning of a set of inputs. The AI component 306 can employ a probabilistic-based, or statistical-based approach, for example, in connection with making determinations or inferences. The inferences can be based in part upon explicit training of classifier(s) (not shown) before employing the system 100, or implicit training based at least upon a user's previous actions, commands, instructions, and the like during use of the system. The AI component 306 can employ any suitable scheme (e.g., neural networks, expert systems, Bayesian belief networks, support vector machines (SVMs), Hidden Markov Models (HMMs), fuzzy logic, data fusion, etc.) in accordance with implementing various automated aspects described herein. The AI component 306, like the context component 304, can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can be calculated and employed in connection with such analysis.

A methodology in accordance with features presented herein will now be described via a series of acts. It is to be appreciated that the methodologies claimed herein are not limited by the order of acts, as some acts may occur in different orders, or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as claimed herein.

Figure 4:
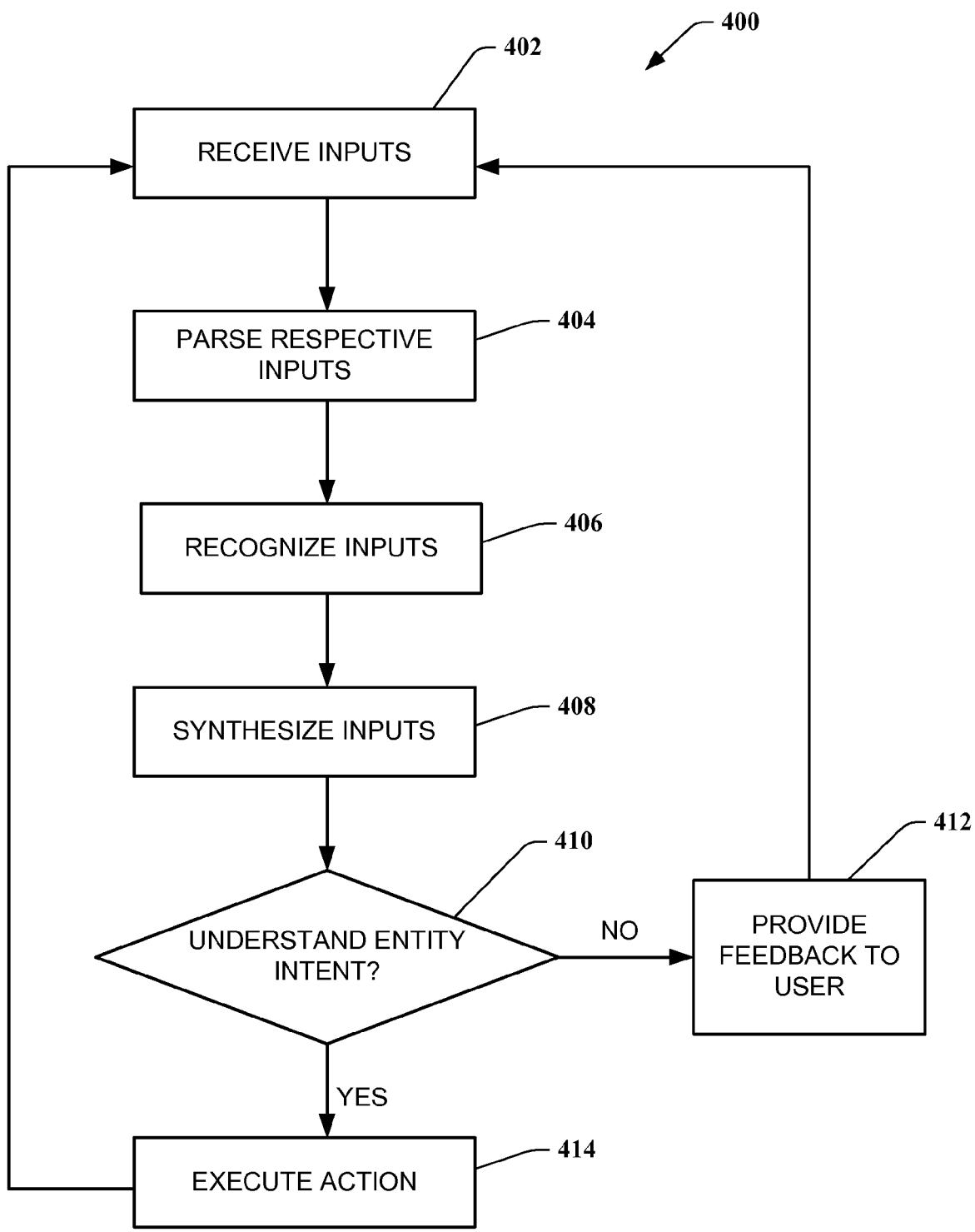
FIG. 4 is a flow diagram that illustrates an embodiment of a methodology in accordance with a multi-modal HCI system.

FIG. 4 illustrates one particular methodology 400 for processing of multi-modal inputs. At 402 inputs are received from a plurality of modalities (e.g., text, speech, gaze, audio, video, images, inflection, frown, lip movement, gestures, handwriting, pen inputs, environment, analog, digital, wireless, global positioning system, temperature, noise sensors, motion sensors, clocks, humidity sensors, altitude, orientation, . . . and any other suitable type of input for conveying information or intent). At 404, a subset of the inputs are parsed to filter extraneous information and converge on respective sets of information that are meaningful for a corresponding system to process in connection with determining an informational or communicative intent or goal of an entity.

At 408, the parsed inputs are synthesized (e.g., filtered, cross-correlated, combined, etc,) so as to create a set of synthesized information that is believed to meaningfully convey entity intent or goal. At 410, it is determined if intent or goal of the entity is understood. It is to be appreciated that such determination does not necessarily require 100% confidence, but rather such confidence level can be tuned as a function of preference. Moreover, the confidence level can dynamically shift as a function of user preference, state, or needs. For example, a much higher confidence level would be required in connection with an emergency call as compared to a request for location of an ice cream parlor. Moreover, level of determined or inferred user frustration or stress (e.g., via inflection in speech, facial expressions . . . ) can be factored in connection with speed of delivery and confidence regarding accuracy of information.

If at 410, intent or goal is not determined with a reasonable (or preferred) level of confidence, feedback is provided to the entity at 412. The feedback is provided to prompt the entity to further clarify, re-enter, or augment inputs (e.g., restate an utterance, re-type text, augment an input, etc.) in order for the methodology 400 to determine or infer the intent or goal with an acceptable confidence level. The clarifying inputs are received at 402 and the methodology repeated. If at 410 the intent or goal is determined with an acceptable confidence level, action in connection with the received inputs is taken at 414.

The feedback can be employed to train the entity in connection with improving quality of inputs as well as building or training various models as described herein. Feedback can be provided in a variety of suitable manners (e.g., voice prompts, text, iconic, video, error indicators, etc.). Moreover, to mitigate frustrating an entity, the feedback can be provided implicitly (e.g., through the course of a dialog between a device using the system 100 and the entity where feedback information sought can be obtained through buried sub-queries or responses that are part of the dialog). For example, if it was unclear whether the user wanted to call John (the user's brother), or Jon (the user's manager), the dialog between the device and user, as part of the feedback process, could remind the user that it was John's birthday next week. If the user, responded back with silence or a thanks there is a high probability that the user was indeed trying to call his brother. On the other hand, if the user intended to call Jon the dialog about his brother's birthday might prompt him to clarify that he meant call his boss—but, the dialog may be more pleasant than a question like "[D]id you mean John Miller, or Jon Jones?".

Thus, the feedback in connection with employment of multiple modalities substantially facilitates converging on communicative or informational goals of an entity quickly and accurately while also streamlining a level of input effort required from the entity.

Turning now to FIGS. 5-10, specific embodiments are described within the context of one (of many) particular application of multi-modal input analysis in connection with features described herein. More specifically, the particular application relates to employment of multiple input modalities in connection with employment of a mapping system program/device.

The following discussion provides a detailed account for design of one particular and exemplary mapping system, based on a legacy version thereof that previously did not have multi-modal capabilities in accordance with the features and aspects described herein. The mapping system has added thereto a "speech" modality into its existing mapping tool implementation, which provides a comprehensive location-based database such as maps, routes, driving directions, and proximity searches. The mapping system also provides an extensive set of mapping-related content, such as business listings, points-of-interest, and other types of data that can be used within applications. In particular, it is equipped with highly accurate address finding and geo-coding capabilities in North America, and contains finely tuned driving direction algorithms using blended information from best-in-class data sources covering 6.7 million miles of roads in the United States.

Loaded with the speech functionality, the value of the mapping system to users is quick, convenient, and accurate location-based information when they plan a long-distance trip, want to find their way around an unfamiliar town or try to find the closest post office, bank, gas station, or ATM in any town in North American. The mapping system has implemented a subset of the desired functionalities provided by its original version, limited mainly by complexity of grammar (used for semantic parsing), which defines what kind of queries the users can make verbally, possibly in conjunction with the other input modalities such as the mouse click and keyboard input.

Figure 5:
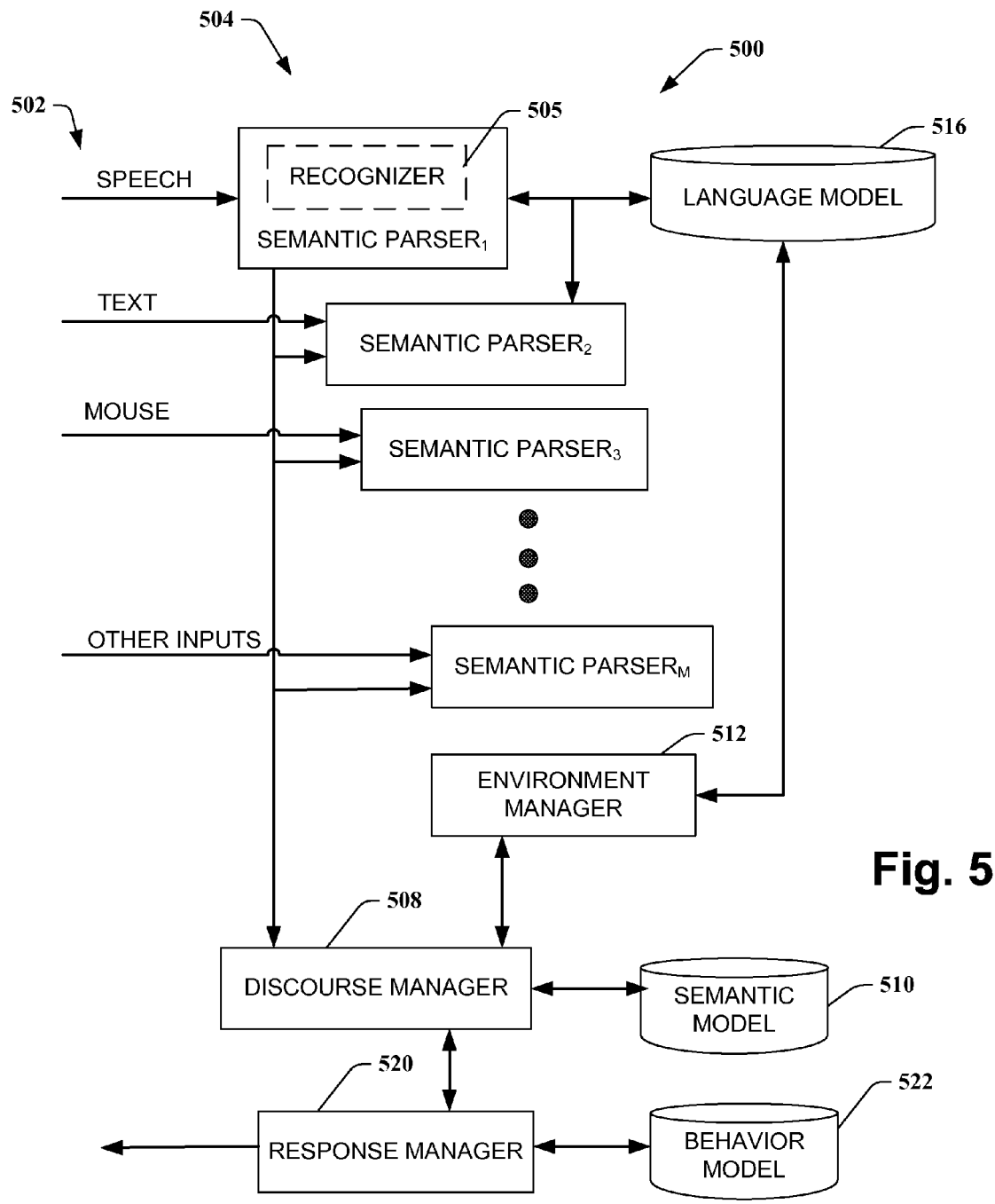
FIG. 5 is a block diagram that illustrates an embodiment of a computer-implemented multi-modal HCI system.

FIG. 5 depicts an embodiment of a speech-centric MUI architecture 500 that facilitates achieving a high level of effectiveness, efficiency, and learnability. Users can communicate with the system 500 through speech, text, and other modalities such as for example pen, gaze, gestures, lip movement, images, audio, hand writing, optical character recognition, camera, etc. Modality fusion is often a center of an MUI system—there are two typical manners for fusing information from different input modalities, namely, early fusion and late fusion. With early fusion, signals are integrated at a feature level and hence a recognition process in one modality would affect that in another modality. Early fusion is suitable for highly coupled modalities such as speech and lip movements. However, early fusion can greatly increase modeling complexity and computational intensity due to its nature of inter-modality influence in a recognition phase. With late fusion, information is integrated at a semantic level. A benefit of late fusion is isolation of input modalities from the rest of the system. In other words, individual recognizers trained using unimodal data can be directly plugged into the system without affecting the rest of the system. This feature makes late fusion easier to scale up to more modalities in the future than with early fusion.

In the late-fusion approach depicted in FIG. 5, input signals 502 received by the system 500 are first processed by semantic parsers (1-M, where M is an integer) 504 associated with a corresponding modality into a surface semantics representation. Note that although each modality typically has its own semantic parser (although not required), and each semantic parser can have individual recognizer(s) 505—the resulting surface semantics are represented in a common semantic representation and is thus independent of the modality. The surface semantics from the input modalities 502 are then fused by a discourse manager (DM) component 508 into a discourse semantics representation. In order to generate discourse semantics, the DM 508 uses a semantic model 510, and interacts with a context manager 512 to utilize and update such information as dialog context, domain knowledge, user's information, and user's usage history, for example. The updated context information can be employed to adapt a language model (LM) 516, which can improve speech recognition accuracy and enhance quality of semantic parsers for a next user-computer interaction.

The discourse semantics, which is an output of the DM 508, is then provided to a response manager (RM) 520 to communicate back to the user. The RM 520 synthesizes proper responses, based on the discourse semantics and capabilities of a user interface, and plays the response back to the user. In this process, a behavior model 522 provides rules to carry out required actions. The combination of the DM 508 and RM 520 can be referred to as a dialog manager.

A major difficulty associated with recognition is recognizing among very large quantities of names. Including all names in grammar is infeasible because the total number of names is often so large that confusability between these names is extremely high and computation costs associated with speech recognition search is expensive.

A speech recognition task is conducted as an optimization problem to maximize a posterior probability:

$$\hat{w} = \arg\max_{w} P(A|w)P(w).$$

where w is a candidate word sequence, and P(w) is a prior probability for the word sequence (or LM probability). This suggests that one can reduce a search effort through controlling the language model 516 so that optionally only most probable names are kept in a search space. One of the approaches used to better estimate P(w) is to exploit user information, especially a user's home address, usage history, and current location. In other words, a speech recognition search task can be simplified by optimizing the following posterior probability:

$$\hat{w} = \underset{w}{\operatorname{argmax}} P(A|w) P(w|E)$$

where the general LM P(w) is now refined (e.g., adapted) to an Environment-specific LM P(w|E), which has a much lower perplexity than an otherwise generic LM—this environment-specific LM is closely related to topic-dependent LM or user-adapted LM. How to exploit the user "environment" information to adapt the LM is the job of the "Environment Manager" component 512, which is described in detail infra.

In a conventional mapping system, a PCFG (Probabilistic Context Free Grammar) is used as the LM. Some examples of CFG rules are shown below:

```
<query> → <app_query> | <pan_query> | <zoom_query> |
<location_query> | <route_query>| <nearest_query> |
<nearby_query> | ...
    <location_query> → show me <location> | show me a map   of
<location> |where is <location> | ...
    <location> → <pointed_location> | <named_location> | ...
    <pointed_location> → here | this point | this | this place | ...
    <named_location> → <city> | <state> |<city_state> | <well-
known_place> | ...
    <city> → New York City | Seattle | Dallas | ...
```

In order to build an environment-adapted LM based on the PCFG grammar, the LM probability P(w|E) is decomposed into a product of words that make up a word sequence w and that follow the grammar at the same time. The majority of the words which are relevant to LM in the example mapping system are the names or name phrases such as "New York City" in the above CRG rules. Many non-name words in the grammar are provided with uniform LM probabilities and hence they become irrelevant in speech recognition and semantic parsing.

Now described is how the conditional probability of a name or name phrase given the environment (user) information is computed by the environment manager component 512. Several related conditional probabilities are computed in advance based on well motivated heuristics pertaining to the mapping task. It is noted that users tend to move to a city before querying for small and less-known locations inside that city. On the other hand, they often move between cities and well-known places at any time. In other words, small places (e.g., restaurants) in a city, except for the city that the user is looking at currently, have very small prior probabilities. Cities, well-known places, and small places in the currently visited city, in contrast, have much higher prior probabilities. For this reason, all names can be organized into two categories: the global level, and the local level. A global-level name list contains state names, city names, City+State, and well-known places such as for example, Yellowstone National park. This global-level name list is included in recognition grammar. The local-level name list, on the other hand, contains detailed location information about a city or a well-known place. When the current city is changed, the local-level name list is changed accordingly.

To speed up loading of the local-level name list, the local list can be pre-built (e.g., for each of 2000 major cities). Pre-building can be advantageous because there are often many place names in large cities and these lists are slow to build. For local-name lists of small cities, they can be built when the city is first visited, and the lists can be cached in memory in order to speed up the process when visited again.

Even after adopting this approach, the number of names is still large. The majority of the names in the global-level name list are for city and state combination (City+State). The simplest way to include these names in the grammar would be to list them all one by one. This, however, requires more than 100,000 distinct entries in the grammar. Typical recognition engines can not handle grammars of such size efficiently and effectively. Accordingly, a further approach is taken to arrange the cities and states in separate lists and allow for combinations of them. This approach greatly reduces grammar size since only 30,000 cities and 50 states are needed. Unfortunately, this will provide invalid combinations such as "Seattle, California". It also increases the name confusability since now there are more than 30,000*50=1,500,000 possible combinations. To overcome this difficulty, an option is that only valid City+State combinations are selected to be listed. To accomplish this, the grammar is prefixed so that all names are organized based on city names, and each city name can only follow a valid subset of the 50 state names. The prefixed grammar can be processed by recognition engines rather efficiently. For some slow systems where speed and accuracy may still be inadequate, the number of City+State combinations can be further pruned.

The second heuristic adopted by the mapping system is motivated by the intuition that if a user queries restaurants a lot, the probability that he/she will query new restaurants should be high even though they have not been queried before. With this heuristic, all names are organized into N classes (N being an integer) including gas stations, schools, restaurants, airports, etc. A list of example classes is shown below in Table 1.

TABLE 1

List of location classes

| Class ID | Class Type |
| --- | --- |
| 1 | state |
| 2 | city |
| 3 | well-known Places |
| 4 | galleries |
| 5 | ATMs and banks |
| 6 | gas stations |
| 7 | hospitals |
| 8 | hotels and motels |
| 9 | landmarks |
| 10 | libraries |
| 11 | marinas |
| 12 | museums |
| 13 | nightclubs and taverns |
| 14 | park and rides |
| 15 | police stations |
| 16 | post offices |
| 17 | rental car agencies |
| 18 | rest areas |
| 19 | restaurants - Asian |
| 20 | restaurants - Chinese |
| 21 | restaurants - delis |
| 22 | restaurants - French |
| 23 | restaurants - Greek |
| 24 | restaurants - Indian |
| 25 | restaurants - Italian |
| 26 | restaurants - Japanese |
| 27 | restaurants - Mexican |
| 28 | restaurants - pizza |
| 29 | restaurants - pizza |
| 30 | restaurants - seafood |
| 31 | restaurants - Thai |
| 32 | schools |

TABLE 1-continued

List of location classes

| Class ID | Class Type |
|---|---|
| 33 | shopping |
| 34 | casinos |
| 35 | stadiums and arenas |
| 36 | subway stations |
| 37 | theaters |
| 38 | airports |
| 39 | zoos |

The probability that a class of names is queried is denoted as P([Class]|History) or P([C]|H). The estimate for this probability is provided to the mapping system:

$$P([C_i]|H) = \frac{\sum_k \exp(-\lambda_h(T - t_{ik}))}{\sum_j \sum_k \exp(-\lambda_h(T - t_{jk}))}.$$

where $t_{ik}$ is the time the names in class $C_i$ was queried the k-th time (as the "History" information), T is the current time, and $\lambda_h$ is the forgetting factor. It is further assumed that $[C_i]$ is independent of other factors in the environment. This particular form of the probability adopted indicates that the further away a past class query is, the less it will contribute to the probability of the current class query.

The third heuristic adopted is motivated by the intuition that even though names in the global-level name list are likely to be queried by users, the probabilities that each name would be queried will be different. For example, large cities such as San Francisco and Boston are more likely to be queried than small cities such as Renton. For this reason, the prior probabilities of all cities and well-known places are estimated in advance. The estimation is based on the log data from the mapping system. The log recorded raw queries submitted by users of the mapping system.

More than 40 GB of the log data was processed to obtain statistics of states, cities, and well-known places that users have queried. It was found that for the cities, the probability computed by the log data is quite similar to that estimated based on the city population. The probability for each name in the class given the class label is denoted as P(N|[C]); examples are P(Name|[Class]='City') and P(Name|[Class]='WellKnownPlace'). For local-level names, a uniform distribution was assumed for P(N|[C]). Tables 2 and 3 list the most frequently queried ten States and cities respectively:

TABLE 2

Top 10 States queried by users of the mapping system and their estimated probabilities.

| Top # | Name | Occurrence in IIS log | Relative Frequency |
|---|---|---|---|
| 1 | California | 2950295 | 0.127832 |
| 2 | Texas | 1791478 | 0.009605 |
| 3 | Florida | 1512045 | 0.065515 |
| 4 | New York City | 1117964 | 0.048440 |
| 5 | Pennsylvania | 1074052 | 0.046537 |
| 6 | Illinois | 1024543 | 0.044392 |
| 7 | Ohio | 1006874 | 0.043626 |
| 8 | New Jersey | 782871 | 0.033920 |

TABLE 2-continued

Top 10 States queried by users of the mapping system and their estimated probabilities.

| Top # | Name | Occurrence in IIS log | Relative Frequency |
|---|---|---|---|
| 9 | Michigan | 776841 | 0.033660 |
| 10 | Georgia | 738660 | 0.032005 |

TABLE 3

Top 10 cities queried by users of the mapping system and their estimated probabilities.

| Top # | Name | Occurrence in IIS log | Relative Frequency |
|---|---|---|---|
| 1 | Houston, Texas | 309246 | 0.014637 |
| 2 | Chicago, Illinois | 202948 | 0.009605 |
| 3 | Dallas, Texas | 169710 | 0.008032 |
| 4 | Los Angeles, California | 166005 | 0.007857 |
| 5 | San Diego, California | 141622 | 0.006656 |
| 6 | Atlanta, Georgia | 140637 | 0.006656 |
| 7 | Orlando, Florida | 135911 | 0.006433 |
| 8 | San Antonio, Texas | 122723 | 0.005809 |
| 9 | Seattle, Washington | 115550 | 0.005469 |
| 10 | Las Vegas, Nevada | 113927 | 0.005392 |

The fourth heuristic implemented in the mapping system uses the intuition that location names related to the user are more likely to be queried than other names. For example, if a user lives in the Seattle, he/she is more likely to query locations in or close to the Seattle. We calculate this probability class by class. This probability is denoted as P(Name|[Class], User) or simply P(N|[C],U) and estimate it according to:

$$P(N_i|[C_k], U) = \frac{S(N_i|[C_k], U)}{\sum_{j:N_j \in [C_k]} S(N_j|[C_k], U)}$$

where $$S(N_i|[C_k],U) = \exp(-\lambda_u d_{iU}) P(N_i|[C_k]),$$

and $d_{iU}$ is the distance between $N_i \in C_k$ and the user's home. $\lambda_u$ is the corresponding decaying parameter.

The fifth heuristic uses the intuition that locations close to the currently visited city are more likely to be queried than other locations. Following the same example, if the user lives in Seattle, not only is he/she more likely to query Bellevue than Springfield, but he/she is also more likely to query for "Everett, Washington" than "Everett, Massachusetts". This probability is denoted as P(Name|[C],CurrentLocation) or simply P(N|[C],L) and estimate it as:

$$P(N_i|[C_k], L) = \frac{S(N_i|[C_k], L)}{\sum_{j:N_j \in C_k} S(N_j|[C_k], L)}$$

where $$S(N_i|[C_k],L) = \exp(-\lambda_l d_{iL}) P(N_i|[C_k])$$

and $d_{iL}$ is the distance between $N_i \epsilon C_k$ and the current location. $\lambda_1$ is the corresponding decaying factor.

The final, sixth heuristic adopted is based on the intuition that if a user queries a location often recently, he/she is likely to query the same location again in the near future. For example, if the user lives in Seattle, but he/she queried for "Everett, Massachusetts" several times recently, it would be expected that he will more likely to query for "Everett, Massachusetts" than "Everett, Washington" even though Everett, Washington" is more close to his home. This probability is denoted as P(Name|[C],History) or simply P(N|[C],L) and estimate it as:

$$P(N_i|[C_n], H) = \frac{S(N_i|[C_n], H)}{\sum_{j:N_j \in C_n} S(N_i|[C_n], H)}$$

where $$S(N_i|[C_n], H) = \sum_k \exp(-\lambda_h(T - t_{ik}))P(N_i|[C_n]).$$

and $t_{ik}$ is the time when the name $N_i \epsilon C_n$ was queried the k-th time. T is the current time, and $\lambda_h$ is the forgetting factor.

With the above assumptions and heuristics based on well founded intuitions, the conditional probability P(Name|Environment) was obtained as:

$$P(N_i|E) = \sum_{C_n} P(N_i|[C_n], E)P([C_n]|E)$$

$$= \sum_{C_n} P(N_i|[C_n], U, L, H)P([C_n]|H)$$

$$= \sum_{C_{ni}} \frac{P(N_i, U, L, H|[C_n])}{P(U, L, H|[C_n])} P([C_n]|H)$$

$$= \sum_{C_{ni}} \frac{P(U, L, H|N_i, [C_n])P(N_i|[C_n])}{P(U, L, H|[C_n])} P([C_n]|H)$$

It was further assumed that U, L, and H are independent of each other. This leads to the approximation of $$P(N_i|E) \approx \sum_{C_{ni}} \frac{P(U|N_i, [C_n])P(L|N_i, [C_n])}{P(U|[C_n])P(L|[C_n])P(H|[C_n])} P([C_n]|H)$$

$$= \sum_{C_{ni}} \frac{P(N_i|U, [C_n])P(N_i|L, [C_n])P(N_i|H, [C_n])}{P^2(N_i|[C_n])} P([C_n]|H)$$

The above equation can be further simplified by assuming that each name belongs to one class. This is accomplished by using the location in the map—the semantic meaning of the name—as the unique identifier of the name. For example, Everett can mean "Everett, Washington", "Everett, Massachusetts", "Everett Cinema", and somewhere else. In the mapping system's grammar, several different kinds of Everett's were allowed for; and each of them, however, is mapped to a different location in the semantic model with a different probability. This treatment removes the class summation in the above and we have the final expression of the environment-specific name probability of:

$$P(N_i|E) = \frac{P(N_i|U, [C_n])P(N_i|L, [C_n])}{P^2(N_i|[C_n])} P([C_n])|H),$$

where $N_i \epsilon C_n$ and where all the probabilities at the right hand side of the equation have been made available using the several heuristics described above.

In the previous discussion, probabilities for each individual conditional probability in the above equations were normalized. However, the normalization can be done at the last step. It was also noted that the system is not sensitive to small changes of the probabilities. With this in mind, in the mapping system implementation, the probabilities were updated when the probability change becomes large. For example, when the current location is 10 miles away to the previous location, or there are 20 new queries in the history. For the same reason, the decaying parameters and forgetting parameters are determined heuristically based on the observations from the IIS log.

Another important issue in the mapping system's LM computation is smoothing of the probabilities since the training data is sparse. In the current system implementation, the probabilities are simply backed up to the uniform distribution when no sufficient amounts of training data are available.

With all the above environment or user-specific LM implementation techniques provided by the Environment Manager component 512 in the mapping system, most ambiguities encountered by the system can be resolved. For example, when a user asks: "Where is Everett", the system will infer the most probable Everett based on the different LM probabilities for the different Everett's. In most cases, the most probable Everett is either the closest Everett or the frequently visited Everett. In case the system's guess is incorrect, the user can submit a new query which contains more detailed information in the query. For example, he/she can say "Where is Everett, Washington".

Further, in addition to providing useful environmental or user information to infer the probabilities of queries in LM, the Environment Manager component 512 of the mapping system also permits inference of missing elements in users' queries to obtain the complete discourse semantic information.

Some quantitative results are now presented to show how a user modeling strategy discussed so far in this section has contributed to drastic improvement of the LM. In Table 4, perplexity numbers of the LM are listed with and without use of the user-specific information. These perplexity numbers are based on four ways of constructing the mapping system with and without using the probabilities and using user modeling. A lower perplexity of the LM indicates a higher quality of the LM, which leads to a lower ambiguity and higher accuracy for speech recognition. It was observed that the system utilizing the user-specific information provides a much lower perplexity and better LM quality than that otherwise.

TABLE 4

Four conditions under which the LM of the MapPointS system is constructed and the LM perplexity associated with each condition.

| Conditions | LM Perplexity |
| --- | --- |
| Uniform probability for all city/place names | 5748528 |

TABLE 4-continued

Four conditions under which the LM of the MapPointS system is
constructed and the LM perplexity associated with each condition.

| Conditions | LM Perplexity |
|---|---|
| Two-level structure for cities and places, but using uniform probabilities for city names | 98810 |
| Same as above but using prior probabilities of city names | 5426 |
| Same as above but including user-specific information | 241 |

The mapping system involves its input from multiple modalities, its output in map presentation, and a large set of data for training the various system components we have just described. Without carefully architecting the system, the application would be inefficient and difficult to develop. In designing the mapping system, several design principles and software engineering considerations were followed.

The first principle and consideration is separation of interface and implementation. Following this principle, components were isolated by hiding implementation details. Different components interact with each other through interfaces that have been well defined in advance. This allowed for developing and testing the system by refining components one by one. It also allowed for hooking the mapping system to different automatic speech recognition (ASR) engines without substantially changing the system.

The second principle and consideration is separation of data and code. The mapping system can be considered as a system whose design is driven by data and grammar. In the system design, data was separated from code and the data was stored in a file system. The size of the data stored was significant since all the city names, place names, and their associated prior probabilities were maintained. By isolating the data from the code, the system was freely converted from one language to another by a mere change of grammar, the place names, and the ASR engine for a new language.

The third principle and consideration is separation of modalities. Modalities of the speech input, text input, and the mouse input were separated by representing their underlying semantic information in a common service modeling language (SML) format. This allowed us to debug modalities one by one, and also allowed us to integrate more modalities in the future for possible system expansion by simply hooking the existing system to a new semantic parser.

The fourth principle and consideration is full exploitation of detailed user feedback. The mapping system provided detailed feedback to users in steps that are carried out in processing the users' requests. In doing so, the users become able to know whether the system is listening to them and whether the ASR engine recognized their requests correctly.

The final principle and consideration is efficient design of the application grammar. One of the significant problems of a large system like the mapping system is creation of specific application grammar, or grammar authoring. A good structured grammar can significantly reduce effort in interpreting results of speech recognition. In the subject implementation, the grammar was organized so that the semantic representation of the speech recognition results could be interpreted recursively.

Robustness to acoustic environment, which allows speech recognition to achieve immunity to noise and channel distortion, is a significant aspect of any speech-centric HCI system design consideration. For example, for a mapping system to be acceptable to the general public, it is desirable to remove the need for a close-talking microphone in capturing speech. The potential mobile application of a mapping system for navigation while traveling presents an even greater challenge to noise robustness. Although close-talking microphones pick up relatively little background noise and allow speech recognizers to achieve high accuracy for the mapping system tasks, it was found that users much prefer built-in microphones even if there is minor accuracy degradation. With the convenience of using built-in microphones, noise robustness becomes a key challenge to maintaining desirable speech recognition and understanding performance.

It is to be appreciated that dynamic source routing (DSR) applications can be standardized for a plain phone, PDA, or a smart phone where speech recognition is carried out at a remote server. To overcome bandwidth and infrastructure cost limitations, one approach is to use a standard codec on a device to transmit speech to the server where it is subsequently decompressed and recognized. However, since speech recognizers only need some features of the speech signal (e.g., Mel-cepstrum), the bandwidth can be further saved by transmitting only these features.

In DSR applications, it is easier to update software on the server because one cannot assume that the client is always running the latest version of the algorithm. With this consideration in mind, while designing noise-robust algorithms, it can be desirable to make algorithms front-end agnostic. That is, algorithms should make no assumptions on structure and processing of the front end and merely try to undo whatever acoustic corruption that has been shown during training. This consideration also favors noise-robust approaches in the feature rather than in the model domain.

An overview of the mapping system architecture and its major functional components was presented supra. Several key software design engineering principles and considerations in developing the mapping system are also described. A useful lesson learned in developing the mapping system is the importance of user or environmental modeling, where the user-specific information and the user's interaction history with the system are exploited to beneficially adapt the LM. The drastically reduced perplexity of the LM not only improves speech recognition performance, but more significantly enhances semantic parsing (understanding) which acts on all types of input modalities, speech or otherwise. Some quantitative results presented in Table 4 substantiate this conclusion.

The mapping system is a map query application that supports a large set of map query commands through speech, text, and pointing devices. These commands can be classified into the following five categories:

Application Control: Application control commands are used to control the mapping system applications. For example, a user can use speech (as well as other modalities) to quit the application, to pan the map towards eight directions, to zoom the maps, or to open and save the map.

Location Query: Location queries are used to search for the map of a specific location. For example, a user can query for a map with city names, state names, joint city and state names, place names (e.g., Seattle University), or referenced locations (e.g., here; this place; and this area, etc., which are indicated by the mouse click rather than by the speech input.

Route Query: Route queries are used to obtain directions from one location to another. There are two types of such queries. The first type contains both "from" and "to" information. For example, a user can say "How do I get from <startlocation> to <endlocation>" to obtain directions from <startlocation> to <endlocation>. The <startlocation> and <endlocation> can be any location type specified in location query. The second type of queries contains information about "to location" only. "How may I go to <location>" is an example of such queries. When a query with "to location" only is submitted by a user, the system will infer the most probable from location based on the user's dialog context.

Nearest Query: "Nearest" queries are used to find the closest or the nearest instance of a specific type of places to the current location. The mapping system supports about 50 types of locations including bank, gas station, airport, ATM machine, restaurant, and school. For instance, a user can query for the nearest school, Chinese restaurant, etc. When such a query is made, MapPointS will infer the most probable current reference location based on the dialog context.

Nearby Query: "Nearby" queries are similar to the "nearest" queries above. The difference is that all nearby instances of a type of places, instead of only one, are displayed in the nearby queries. For example, a user can query for all nearby gas stations. Similar to the situation of the nearest query, the mapping system needs to infer the most probable reference location before executing the query.

Figure 6:
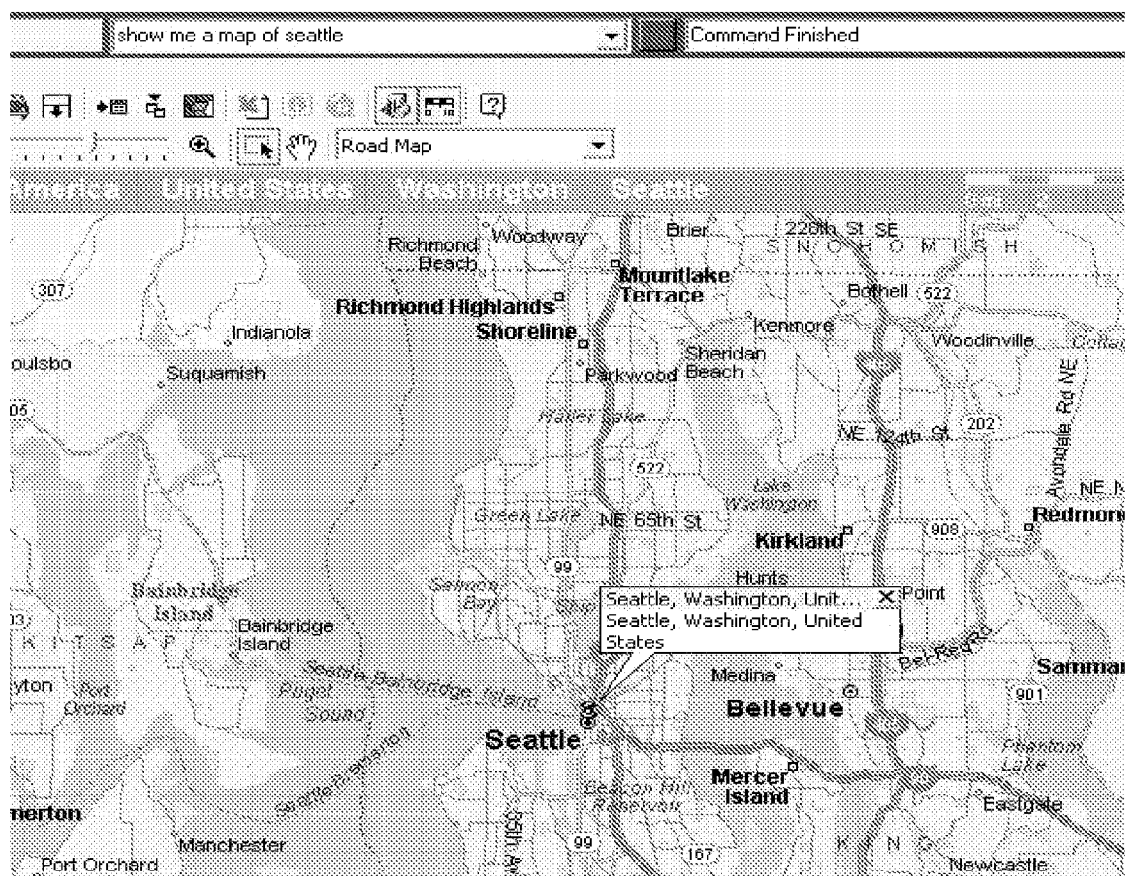
FIGS. 6-10 are exemplary computer interface representations in accordance with various HCI interactions.

Examples of the above five types of queries are provided now. FIG. 6 is a screen shot where a map of Seattle is displayed as a result of speech command used in the location query: "show me a map of Seattle". A typical map of Seattle with its surroundings is immediately displayed. All cities in the U.S. can be queries in the same manner.

Figure 7:
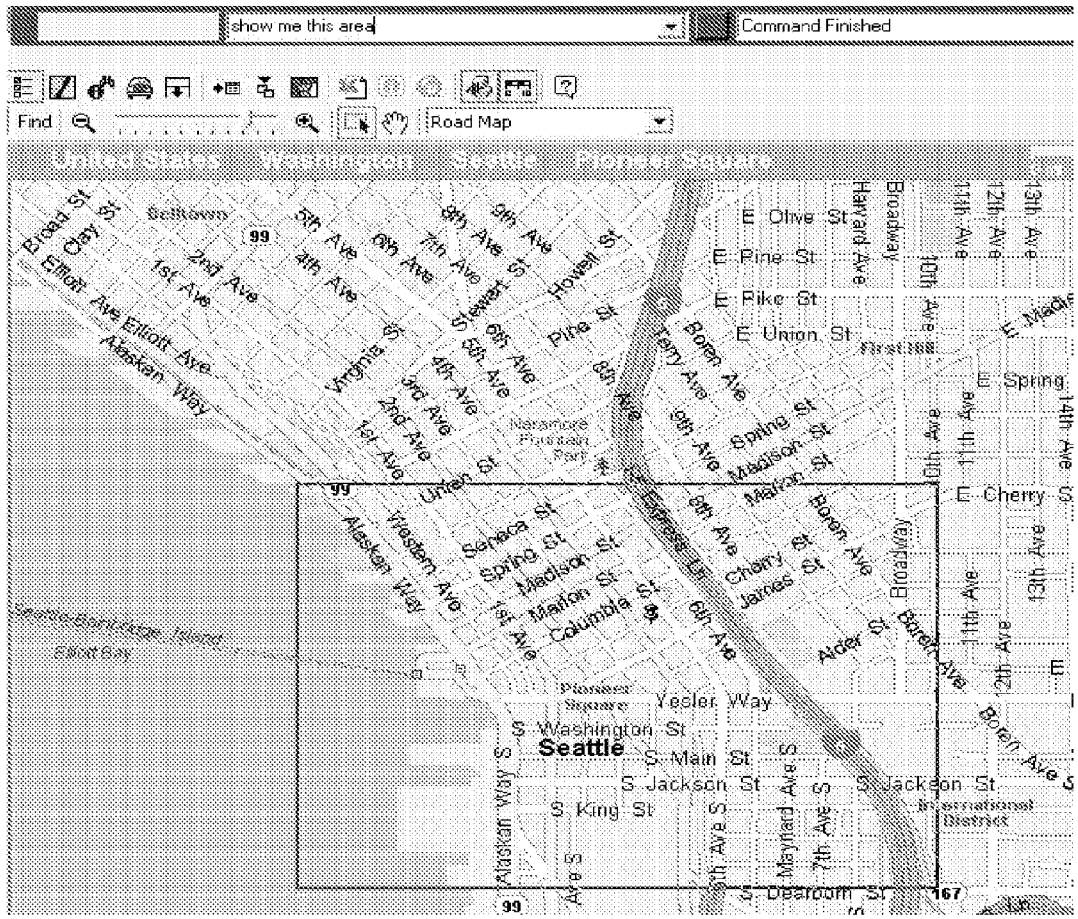

FIG. 7 provides a multimodal interaction example where the user makes a location query by selecting an area with mouse and zooming the picture to just that part of the map while using the following concurrent speech command: "show me this area". The portion of the map selected by the user is displayed in response to such a multimodal query.

Figure 8:
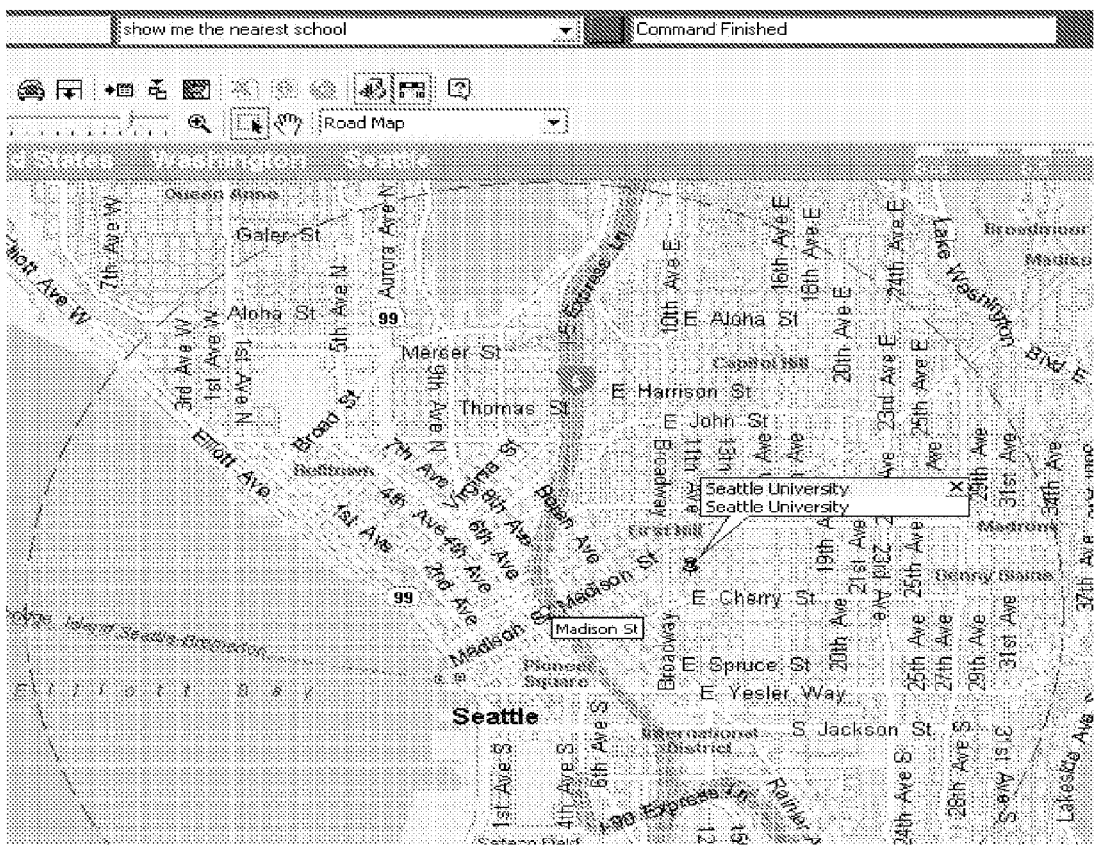

FIG. 8 is another multimodal interaction example for the nearest location query. In this case, the user clicks on a location, and more or less concurrently issues the command: "Show me the nearest school" with speech. The mapping system displays "Seattle University" as the result based on the location that the user just clicked on.

Figure 9:
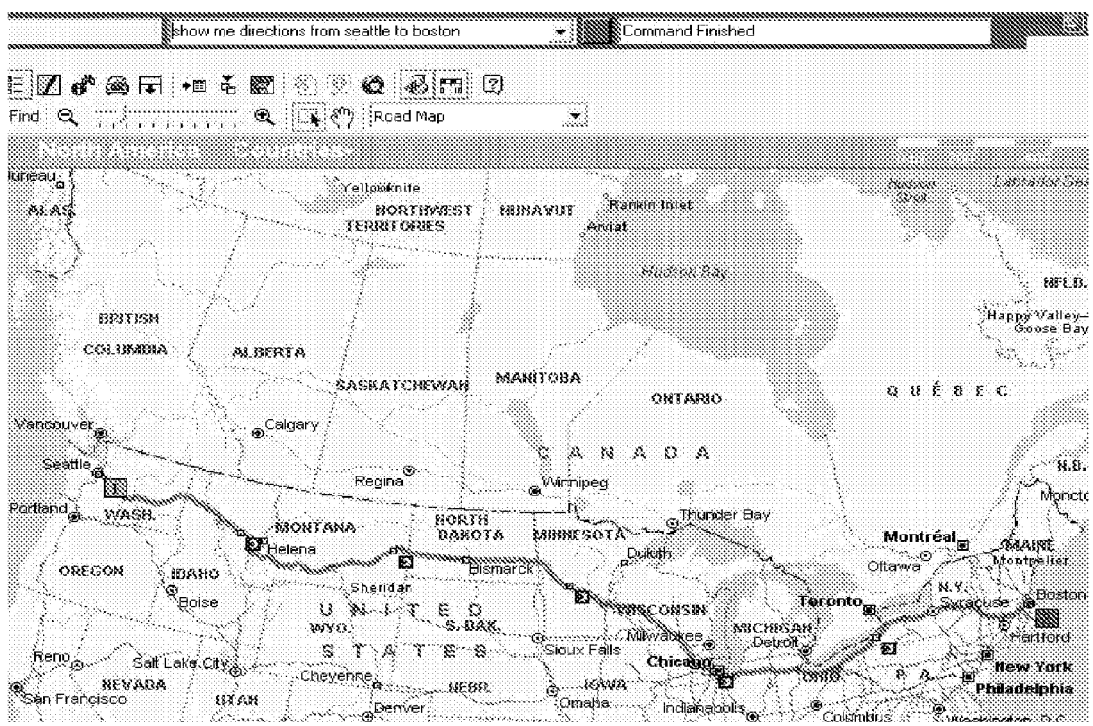

In FIG. 9 an example is presented of a route query to find a direction from Seattle to Boston, with a speech utterance such as "Show me directions from Seattle to Boston", or "How may I go from Seattle to Boston", etc. If the immediately previous location is Seattle, then saying just "How may I go to Boston" will give the identical display as the response to the query.

Figure 10:
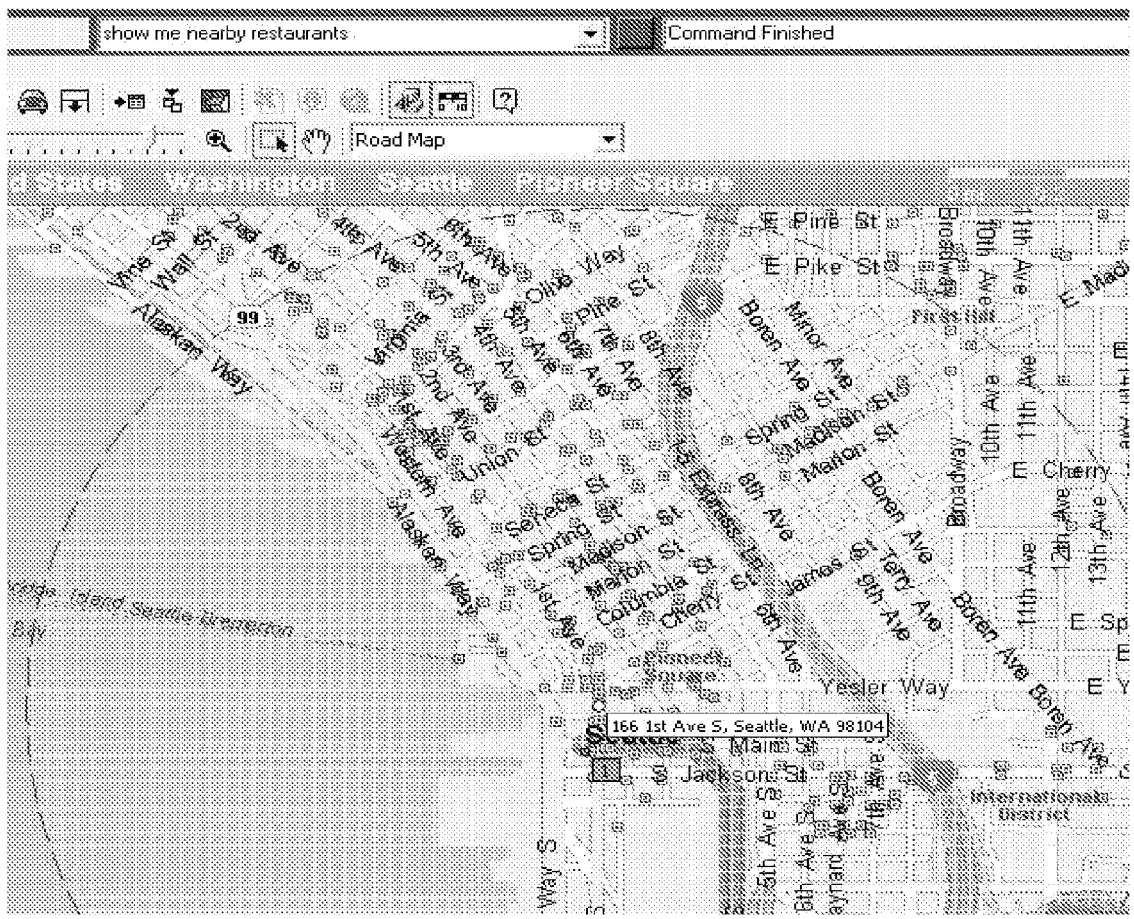

A further example is provided in FIG. 10 of querying nearby restaurants by speaking to the mapping system with "show me all nearby restaurants". The system assumes the current location of the user based on the previous interactions, and is hence able to display all nearby restaurants without the need for the user to specify where he currently is.

Integrated interface for Speech and Text: In the mapping system, a user not only can use speech to query the application but also can use a natural text input to ask for the same thing. For example, the user can say "Where is the University of Washington" to have the University of Washington be identified in the map. Alternatively, the user can just type in "Where is the University of Washington" in the command bar and obtain the same result.

Recognition of a large quantity of names: As mentioned, the mapping system allows its users to query for all cities and places in the US. Accurate recognition of all these names is difficult since there are too many names to be potential candidates. For example, there are more than 30,000 distinct city names in the US, and the total number of valid combinations of "city, state" alone is already larger than 100,000, not to mention all the school names, airport names, etc. in all cities.

Inference of missing information: When a user queries information, he/she may not specify full information. For example, when a user submits a query "How may I get to Seattle University", the mapping system needs to infer the most probable location that the user is currently at. This inference is automatically performed based on the previous interactions between the user and the mapping system.

For the system functionalities illustrated in the above description and examples, the mapping system demonstrates the following four specific features:

Multi-modal human-computer interaction: As discussed supra, one of the trends of HCI is the integration of multi-modal inputs, through which speech recognition is integrated with various other modalities such as keyboard and mouse inputs. The mapping system is a good show case for this capability since it includes both location search (via the name) and location pointing/selection. The former is most naturally accomplished using voice command because it is difficult to use a mouse or a pen to search for one of a very large number of items (cities, etc). The latter, location pointing and selection, on the other hand, is relatively easy to be fulfilled with mouse clicks. For example, a user may ask the system to "show me a map of Seattle". The user can then use the mouse to click on a specific location or to select a specific area. He/she can then or concurrently issue the command "Show me the nearest school around here" with speech as the input.

Figure 11:
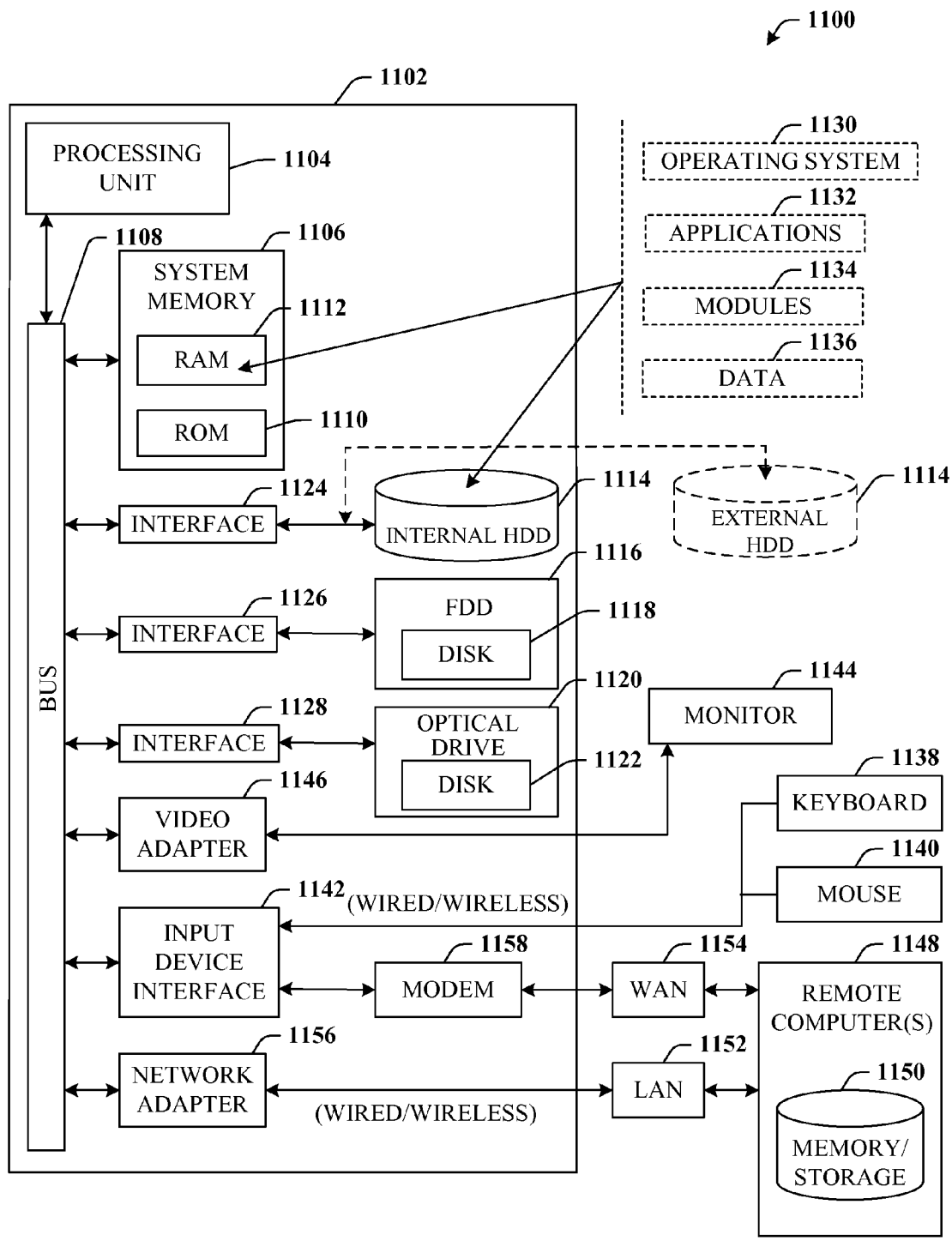
FIG. 11 illustrates a block diagram of a computer operable to execute the disclosed architecture.

Referring now to FIG. 11, there is illustrated a block diagram of an exemplary computer system operable to execute the disclosed architecture. In order to provide additional context for various aspects of the subject invention, FIG. 11 and the following discussion are intended to provide a brief, general description of a suitable computing environment 1100 in which the various aspects of the invention can be implemented. Additionally, while the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the invention includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 11104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE-1394 interface technologies. Other external drive connection technologies are within contemplation of the subject invention.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, a serial port, an IEEE-1394 port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE-802.11(a, b, g, etc.) to provide secure, reliable, fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 11 Mbps (802.1 a) or 54 Mbps (802.11b) data rate, for example, or with products that contain both bands (dual band), so the networks can provide real-world performance similar to the basic 10BaseT wired Ethernet networks used in many offices.

Figure 12:
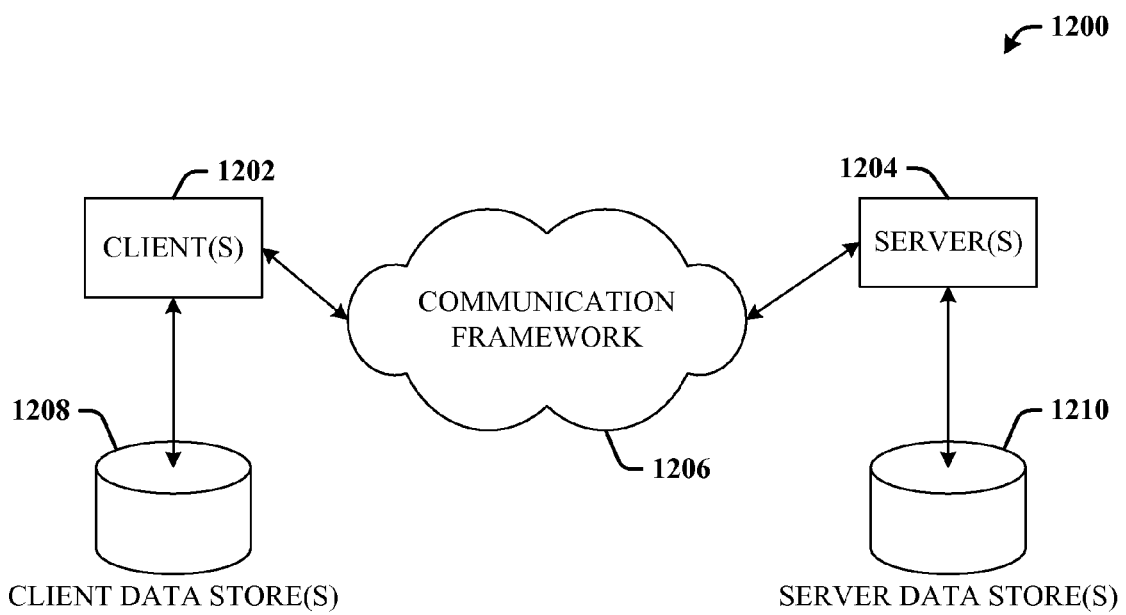
FIG. 12 illustrates a schematic block diagram of an exemplary computing environment.

Referring now to FIG. 12, there is illustrated a schematic block diagram of an exemplary computer compilation system operable to execute the disclosed architecture. The system 1200 includes one or more client(s) 1202. The client(s) 1202 can be hardware and/or software (e.g., threads, processes, computing devices). The client(s) 1202 can house cookie(s) and/or associated contextual information by employing the invention, for example.

The system 1200 also includes one or more server(s) 1204. The server(s) 1204 can also be hardware and/or software (e.g., threads, processes, computing devices). The servers 1204 can house threads to perform transformations by employing the invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented interface, comprising:
a set of parsers configured to parse information received from a plurality of sources including a mixed modality of inputs;
a discourse manager configured to:
identify correlations in the information;
interpret the mixed modality of inputs based on environmental data associated with at least one of the mixed modality of inputs;
based on the identified correlations and the interpreted mixed modality of inputs, at least one of determine or infer an intent associated with the information; and
generate a confidence level for the intent as a function of the environmental data; and
a response manager configured to:
evaluate a first input of the mixed modality of inputs, the first input having a first modality initially employed as a primary modality;
based on the generated confidence level, provide feedback to request a second input having a second modality different from the first modality; and
substitute the second modality for the first modality as the primary modality until the environmental data changes.

2. The computer-implemented interface of claim 1, wherein the first modality is a speech modality, and the environmental data identifies environmental noise.

3. The computer-implemented interface of claim 2, wherein the second modality is a tool-based modality.

4. The computer-implemented interface of claim 2, wherein the response manager is further configured to prompt for re-engagement of the speech modality as the primary modality when the environmental data changes.

5. The computer-implemented interface of claim 4, wherein the discourse manager is configured to utilize the environmental data to consider voice inflection and stress level in the speech modality to generate the confidence level.

6. The computer-implemented interface of claim 1, further comprising an artificial intelligence (AI) component configured to employ a probabilistic-based analysis in connection with inferring the intent.

7. The computer-implemented interface of claim 1, the environmental data comprising at least one of: a user state, a device state, a context of a session of the computer-implemented interface, historical or current extrinsic information about one or both of the plurality of sources or the mixed modality of inputs, or a device capability.

8. The computer-implemented interface of claim 1, the mixed modalities comprising at least three of the following modalities: speech, text, mouse input, pen input, gesture, pattern recognition, gaze, symbol input, audio, expression, external device input, location, temperature, vibration, orientation, or movement.

9. The computer-implemented interface of claim 1, wherein the set of parsers is further configured to utilize language model to parse the information into surface semantics represented by a common modality-independent semantic representation.

10. The computer-implemented interface of claim 9, wherein the discourse manager is further configured to update the environmental data and utilize the updated environmental data to adapt the language model to enhance accuracy of at least one parser of the set of parsers by computing a conditional probability of a phrase of the information.

11. The computer-implemented interface of claim 1, wherein the discourse manager is further configured to employ late modality fusion to integrate the information at a semantic level, wherein each of the first and second modalities has a respective semantic parser with an individual recognizer, the late modality fusion resulting in surface semantics represented by a common modality-independent semantic representation.

12. A computer-readable storage medium storing instructions, the instructions when executed by a computing device causing the computing device to perform operations comprising:
    receiving an input in a first modality as a primary modality;
    dynamically generating a first confidence level as a function of environmental data associated with the input, the environmental data comprising at least one of: a user state, a device state, a context of a computer-implemented interface session, historical or current extrinsic information about the input or a source of the input, or a device capability;
    attributing a first weight to the input as a function of the first confidence level;
    based on the first weight, determining that the first modality is insufficient as an input and receiving at least one other input in a second modality different from the first modality as the primary modality;
    dynamically generating a second confidence level as a function of updated environmental data associated with the input;
    attributing a second weight to the input as a function of the second confidence level;
    based on the second weight, determining that the first modality has become sufficient and re-engaging the input in the first modality as the primary modality;
    analyzing the input and the at least one other input;
    at least one of determining or inferring an intent associated with the input and the at least one other input based on the analyzing; and
    performing late fusion on the input and the at least one other input to integrate the input and the at least one other input at a semantic level.

13. A method comprising: parsing inputs received from a plurality of sources into surface semantics represented in a semantic representation by utilizing a language model, each of the plurality of sources corresponding to a different modality;
    providing environmental data associated with at least one of the inputs, the data comprising one or both of current data or historical data;
    adapting the language model to enhance accuracy of the parsing by utilizing the environmental data to compute at least one environmentally-specific conditional probability of at least one phrase of the inputs received from the plurality of sources;
    utilizing the semantic representation to generate discourse semantics;
    utilizing the discourse semantics to synthesize one or more responses to the inputs received from the plurality of sources;
    further comprising:
    generating, as a function of the environmental data, a confidence level for an intent associated with the inputs received from the plurality of sources;
    evaluating a first input of the inputs, the first input having a first modality initially employed as a primary modality;
    based on the generated confidence level, providing feedback to request a second input of the inputs having a second modality different from the first modality, and
    substituting the second modality for the first modality as the primary modality until the environmental data changes.

14. The method of claim 13, further comprising utilizing one modality to complete or refine input associated with another modality.

15. The method of claim 13, further comprising performing a mapping task associated with the inputs received from the plurality of sources, wherein performing the mapping task comprises:
    computing a plurality of conditional probabilities of place names corresponding to the inputs based on heuristics, wherein the plurality of conditional probabilities comprise the at least one environmentally-specific conditional probability;
    organizing the place names at a global level and local level for at least partly including in a recognition grammar;
    pre-building and caching a local list of the place names corresponding to the local level; and
    prefixing the recognition grammar with a single category of the place names.

16. The method of claim 13, wherein the semantic representation comprises a common modality-independent semantic representation.

17. The method of claim 13, wherein adapting the language model enhances speech recognition accuracy of at least one or more parsers utilized for parsing the inputs.

18. The method of claim 13, wherein to generate the discourse semantics comprises:
    identifying one or more correlations among the inputs;
    interpreting the inputs based on the environmental data; and
    based on the one or more identified correlations and the interpreted inputs, determining or inferring an intent associated with the inputs received from the plurality of sources.

19. A computer-readable storage medium having stored thereon computer executable components for carrying out the method of claim 13.

* * * * *